(12) United States Patent
Depondt

(10) Patent No.: US 11,358,569 B2
(45) Date of Patent: Jun. 14, 2022

(54) WINDSHIELD WIPER DEVICE, IN PARTICULAR WIPER ARM ADAPTER DEVICE, WIPER ARM WAVING THE WINDSHIELD WIPER DEVICE AND WINDSHIELD WIPER HAVING THE WINDSHIELD WIPER DEVICE

(71) Applicant: Robert Bosch GmbH, Stuttgart (DE)

(72) Inventor: Helmut Depondt, Boutersem (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/148,648

(22) Filed: Jan. 14, 2021

(65) Prior Publication Data
US 2021/0237692 A1  Aug. 5, 2021

(30) Foreign Application Priority Data
Jan. 14, 2020  (DE) .......................... 102020200349.1

(51) Int. Cl.
*B60S 1/40* (2006.01)
*B60S 1/38* (2006.01)
*B60S 1/34* (2006.01)

(52) U.S. Cl.
CPC ........... *B60S 1/4003* (2013.01); *B60S 1/3415* (2013.01); *B60S 1/387* (2013.01)

(58) Field of Classification Search
CPC .... B60S 1/3862; B60S 1/4003; B60S 1/3415; B60S 1/387
See application file for complete search history.

(56) References Cited

U.S. PATENT DOCUMENTS

2011/0185531 A1*  8/2011  Egner-Walter ........ B60S 1/3862
15/250.01

FOREIGN PATENT DOCUMENTS

| DE | 102013209196 A1 | 11/2014 |
|---|---|---|
| EP | 2368776 A1 | 9/2011 |
| EP | 2786906 A1 | 10/2014 |
| FR | 2240625 A5 | 3/1975 |

* cited by examiner

*Primary Examiner* — Andrew A Horton
(74) *Attorney, Agent, or Firm* — Micheal Best & Friedrich LLP

(57) ABSTRACT

The invention is based on a windshield wiper device, in particular a wiper arm adapter device, having at least one fluid connection piece (36) which delimits at least one fluid channel (38), and having at least one adapter piece (40), wherein the adapter piece (40) and the fluid connection piece (36) are constructed to be able to be moved relative to each other and are provided to be moved relative to each other during a coupling or uncoupling operation, in particular with a wiper blade (16).
It is proposed that the windshield wiper device comprise at least one coupling unit (42) which is provided to close the fluid channel (38) in accordance with a position of the adapter piece (40) relative to the fluid connection piece (36).

20 Claims, 7 Drawing Sheets

WINDSHIELD WIPER DEVICE, IN PARTICULAR WIPER ARM ADAPTER DEVICE, WIPER ARM WAVING THE WINDSHIELD WIPER DEVICE AND WINDSHIELD WIPER HAVING THE WINDSHIELD WIPER DEVICE

BACKGROUND OF THE INVENTION

A windshield wiper device having at least one fluid connection piece which delimits at least one fluid channel and having at least one adapter piece has already been proposed, wherein the adapter piece and the fluid connection piece are constructed to be able to be moved relative to each other and are provided to be moved relative to each other during a coupling or uncoupling operation, in particular with a wiper blade.

SUMMARY OF THE INVENTION

The invention is based on a windshield wiper device, in particular a wiper arm adapter device, having at least one fluid connection piece which delimits at least one fluid channel, and having at least one adapter piece, wherein the adapter piece and the fluid connection piece are constructed to be able to be moved relative to each other and are provided to be moved relative to each other during a coupling or uncoupling operation, in particular with a wiper blade.

It is proposed that the wiper blade device comprise at least one coupling unit which is provided to close the fluid channel in accordance with a position of the adapter piece relative to the fluid connection piece.

The term "provided" is intended in particular to be understood to mean configured and/or equipped. The fact that an object, in particular the adapter piece and/or the coupling unit, is provided for a specific function is intended in particular to be understood to mean that the object performs and/or carries out this specific function in at least one application and/or operating state. Preferably, the coupling unit is arranged at least partially, in particular at least for the most part, between the fluid connection piece and the adapter piece. Preferably, the fluid connection piece is provided at least during the coupling or uncoupling operation to be moved with the wiper blade relative to the adapter piece. In particular, the coupling unit, in particular in at least one operating state, is arranged at least partially on the fluid connection piece and at least partially on the adapter piece. Preferably, the coupling unit is provided to close the fluid channel by means of a non-positive-locking and/or positive-locking connection during a relative movement of the fluid connection piece and the adapter piece, wherein in particular a position of the adapter piece relative to the fluid connection piece or a position of the fluid connection piece relative to the adapter piece changes. In a particularly preferred manner, the coupling unit is provided to close the fluid channel if at least one spacing of the adapter piece and the fluid connection piece, in particular along at least a coupling path, changes, in particular increases or decreases. It is conceivable for the coupling path to extend at least partially along an axis and/or at least partially in a circular manner about an axis.

A "windshield wiper device" is preferably intended to be understood to be at least a portion, preferably a sub-assembly, of a windshield wiper. It is conceivable for the windshield wiper device to comprise the entire windshield wiper. Preferably, the windshield wiper device is provided for use on a vehicle. Preferably, the windshield wiper device is provided for cleaning a surface, preferably a window on a vehicle. Preferably, the fluid connection piece is provided to direct a fluid, in particular a wiping water mixture, via the fluid channel from a fluid container of a windshield wiper and/or a fluid directing element of the wiper arm to a wiper blade adapter of the wiper blade. In particular, the fluid channel has at least one inlet opening and at least one outlet opening at the wiper blade side, which are arranged in each case at opposing ends of the fluid channel. Preferably, the inlet opening and the wiper-blade-side outlet opening are delimited by the fluid connection piece. Preferably, the fluid channel is constructed as at least one channel-like recess and/or at least one channel which is delimited by a hose-like and/or at least one tubular element, wherein the channel-like recess and/or the channel which is delimited by a hose-like and/or tubular element is provided for guiding a fluid, preferably the washing water mixture. In particular, the fluid connection piece delimits the fluid channel, in particular with the exception of the inlet opening and the outlet opening, at least substantially completely. The fact that a component or a volume, in particular the fluid channel, is "substantially completely delimited" by another component or another volume, in particular the fluid connection piece, is in particular intended to be understood to mean that an entire outer face of the component or the volume which surrounds the component or volume is concealed or surrounded to an extent of particularly at least 90%, preferably at least 95%, in a particularly preferred manner at least 98% and in a quite particularly preferred manner at least 99%, by the other component or the other volume, wherein in particular the other component or the other volume is in abutment with the outer face. In a particularly preferred manner, the coupling unit is arranged in at least one operating state at least partially on and/or inside the fluid channel. Preferably, the coupling unit is provided, by closing the fluid channel, to separate the wiper blade, in particular the wiper blade adapter, in technical fluid terms from the wiper arm, in particular a wiper arm adapter of the wiper arm. Preferably, the windshield wiper device has at least one mounted state, wherein the coupling unit is provided to release the fluid channel in the mounted state, in particular in a position of the adapter piece relative to the fluid connection piece in the mounted state, with respect to a line of a fluid. Preferably, the windshield wiper device has at least one disassembled state, wherein the coupling unit is provided to close the fluid channel at least during the coupling operation from the non-mounted state into the mounted state and/or at least during the uncoupling operation from the mounted state into the non-mounted state. Preferably, the adapter piece is provided for a movement, in particular a position change, relative to the fluid connection piece during the coupling or uncoupling operation to cooperate with the wiper arm adapter and/or the wiper blade adapter. In a particularly preferred manner, the wiper arm adapter is constructed integrally with a wiper rod of the wiper arm. The term "integrally" is intended to be understood in particular to mean connected in a materially engaging manner, such as, for example, by means of a welding process and/or adhesive process, and in a particularly advantageous manner formed on, as by means of production from a casting and/or by means of production in a single-component or multi-component method. In a particularly preferred manner, a technical fluid connection of the wiper arm adapter to the wiper blade adapter is formed by means of the windshield wiper device during the coupling and/or uncoupling operation so as to be, in particular temporarily, separable. Preferably, the fluid channel is constructed as at least one channel-like recess and/or at least one channel which is delimited by a tubular element, wherein the channel-like recess and/or the channel which is delimited by a tubular element is provided for guiding the fluid.

As a result of the configuration of the windshield wiper device according to the invention, an advantageously automatic closure of the fluid channel during a coupling or uncoupling operation of a wiper blade from a wiper arm may be enabled. Undesirable and/or unintentional discharge of the wiping water mixture from the wiper arm during the coupling or uncoupling operation of the wiper blade can advantageously be prevented. An advantageously high level of safety of a user when the wiper blade is changed can thereby be enabled.

It is further proposed that the fluid connection piece, the adapter piece and the coupling unit be constructed as part of a, in particular the above-mentioned, wiper arm. A functionality of the windshield wiper device, in particular for closing the fluid channel, independently of the wiper blade, in particular for changing to the wiper blade, can advantageously be enabled. An advantageously simple and cost-effective construction of the wiper blade can be achieved, in particular since significant components of the windshield wiper device can be arranged independently of the wiper blade on the wiper arm. The fact that the fluid connection piece, the adapter piece and the coupling unit are constructed as part of the wiper arm is intended in particular to be understood to mean that the fluid connection piece, the adapter piece and the coupling unit, regardless of an operating state of the wiper arm, in particular in a state of the wiper arm arranged with spacing from the wiper blade, are arranged on at least one component, in particular the wiper arm adapter, of the wiper arm. Preferably, the fluid connection piece, the adapter piece and/or the coupling unit is/are arranged and/or secured directly and/or indirectly on the wiper arm, in particular the wiper arm adapter. In particular, the fluid connection piece, the adapter piece and/or the coupling unit is/are connected during the coupling operation to the wiper blade, in particular the wiper blade adapter. In particular, the fluid connection piece, the adapter piece and/or the coupling unit is/are separated from the wiper blade, in particular the wiper blade adapter, during the uncoupling operation. Alternatively, it is conceivable for the fluid connection piece, the adapter piece and/or the coupling unit to be constructed as part of the wiper blade, in particular the wiper blade adapter.

In addition, it is proposed that the coupling unit comprise at least one valve element which is arranged on the fluid connection piece and which is provided to close the fluid channel in accordance with the position of the adapter piece relative to the fluid connection piece. An advantageously safe and sealed closure of the fluid channel can be enabled. Preferably, the valve element is arranged at least partially on and/or at least partially inside the fluid channel. Preferably, the valve element is secured to the fluid connection piece and/or constructed integrally with the fluid connection piece. In particular, the valve element can be controlled mechanically, electrically, electronically, hydraulically and/or pneumatically. In a particularly preferred manner, the valve element is provided to be controlled in accordance with the position of the adapter piece relative to the fluid connection piece to open or close the fluid channel. For example, the valve element is constructed as a resiliently loaded, in particular cylindrical, spherical and/or rectangular, stopper which, depending on the position of the adapter piece relative to the fluid connection piece, is moved into the fluid channel to close the fluid channel counter to a resilient force. It is also conceivable for the valve element to be constructed as a non-return valve, wherein the coupling unit is provided to adapt a restoring force of the valve element in accordance with the position of the adapter piece relative to the fluid connection piece. In particular, the valve element is provided to close the fluid channel in a complete or water-tight manner.

It is further proposed that the coupling unit comprise at least one guiding element which is provided to guide the fluid connection piece during a movement relative to the adapter piece on the adapter piece. An advantageously directed relative movement of the fluid connection piece and the adapter piece can be enabled. A movable bearing of the adapter piece and/or the fluid connection piece on the wiper arm, in particular the wiper arm adapter, can advantageously be achieved. An advantageously precise and reliable activation of the coupling unit to close the fluid channel can be carried out. Preferably, the fluid connection piece is movably supported on the adapter piece and the wiper arm adapter by means of the coupling unit, in particular the guiding element. Preferably, the guiding element is constructed in such a manner that the adapter piece is guided relative to the fluid connection piece along the coupling path. In a particularly preferred manner, the guiding element is arranged on the adapter piece or the fluid connection piece. In particular, the guiding element is constructed integrally with the adapter piece or the fluid connection piece. Preferably, the coupling unit comprises at least one counter-guiding element which is constructed to correspond to the guiding element. Preferably, the counter-guiding element is arranged on the adapter piece or the fluid connection piece. In particular, the counter-guiding element is constructed integrally with the adapter piece or the fluid connection piece. Preferably, the guiding element is constructed on the adapter piece or fluid connection piece which is constructed independently of the additional guiding element. Preferably, the guiding element and the additional guiding element are provided to cooperate in order to guide the adapter piece during a movement relative to the fluid connection piece on the fluid connection piece, in particular mechanically. For example, the guiding element is constructed as a journal, pin or bolt, as a rail, a continuation or the like. For example, the counter-guiding element, in particular corresponding to the guiding element, is constructed as a groove, as a recess which is delimited by the fluid connection piece or the adapter piece, as a roller or the like. In particular, the guiding element and the counter-guiding element are constructed together as an elongate hole guide, as a roller guide, as a rail guide or the like.

It is further proposed that the adapter piece have at least one tilting axis, about which the adapter piece can be moved during the coupling or uncoupling operation relative to the fluid connection piece, wherein the coupling unit is provided, at a tilting angle of the adapter piece relative to the fluid connection piece, in particular in a closure direction, about the tilting axis of more than 5°, preferably more than 10° and in a particularly preferred manner more than 15°, to close the fluid channel, in particular completely. It is possible to achieve an advantageously simultaneous closure of the fluid channel and separation of the wiper blade from the wiper arm, in particular since the wiper blade via a movement about the tilting axis can be constructed to be able to be separated from the wiper arm. An advantageously high tolerance range of a movement of the wiper blade relative to the wiper arm about the tilting axis during a wiping operation can be enabled, in particular independently of a closure of the fluid channel. Preferably, the closure direction is orientated at least substantially perpendicularly to the tilting axis. The term "substantially perpendicularly" is intended in particular to be understood to be an orientation of a straight line, a plane or a vector, in particular a direction vector of the closure direction, relative to another straight line, another plane or another vector, in particular the tilting axis, wherein the straight line, the plane or the vector, in particular when viewed in a projection plane, and the other straight line, the other plane or the other vector enclose an angle of 90° and the angle has a maximum deviation of in particular less than 8°, advantageously less than 5° and in a particularly advantageous manner less than 2°. In particular, the wiper blade is provided, via a movement in a direction orientated counter to the closure direction relative to the wiper arm, to be separated from the wiper arm, in particular the wiper arm adapter. In particular, the coupling path is arranged about the tilting axis, in particular in an at least partially circular manner. Preferably, the tilting axis is orientated at least substantially perpendicularly to a main extent axis of the wiper arm, in particular the wiper arm adapter, and/or the wiper blade, in particular the wiper blade adapter. The term "main extent axis" of an object, in particular of the wiper arm, the wiper arm adapter, the wiper blade and/or the wiper blade adapter, is intended in particular to be understood to be an axis which extends parallel with a longest edge of a smallest geometric parallelepiped which still just completely surrounds the object. In a particularly preferred manner, the wiper blade, in particular the wiper blade adapter, is provided to be moved about the tilting axis during the coupling or uncoupling operation. Preferably, the coupling unit has at least one locking position which corresponds to a position of the fluid connection piece and the adapter piece relative to each other, in which the valve element is just completely closed. In addition, it is conceivable for the coupling unit to be provided, at a tilting angle of the adapter piece relative to the fluid connection piece in a direction which is orientated counter to the closure direction about the tilting axis of more than 2°, preferably more than 4° and in a particularly preferred manner more than 6°, to close the fluid channel, in particular completely. In particular, the valve element and/or the coupling unit are constructed in such a manner that the valve element, during a relative movement between the adapter piece and the fluid connection piece in and counter to the closure direction, closes in one of at least two locking positions.

In addition, it is proposed that the coupling unit have at least one coupling element which is arranged at least partially on the valve element and at least partially on the adapter piece and be provided, during a movement of the adapter piece relative to the fluid connection piece into at least one, in particular the above-mentioned, locking position, to cooperate with the valve element in such a manner that the valve element closes the fluid channel, in particular completely. An advantageously direct closure of the fluid channel can be enabled. An advantageously simple and cost-effective coupling between the adapter piece and the fluid connection piece can be enabled. An advantageously low failure susceptibility of the coupling unit for closing the fluid channel can be achieved, in particular as a result of dust, dirt and/or abrasion. Preferably, the coupling element is constructed as a mechanical coupling element which during the movement of the adapter piece relative to the fluid connection piece into the locking position cooperates by means of a positive-locking and/or non-positive-locking connection with the adapter piece, the fluid connection piece and/or the valve element, wherein in particular the valve element closes the fluid channel, in particular completely. In particular, the coupling element extends at least partially along the coupling path between the adapter piece and the fluid connection piece. Preferably, the locking position is a relative position of the adapter piece and the fluid connection piece in relation to each other, wherein in particular the adapter piece and the fluid connection piece are arranged in a state tilted relative to each other about the tilting axis. In particular, the coupling unit is provided to prevent a relative movement of the adapter piece and the fluid connection piece relative to each other beyond the locking position and/or to close the fluid channel, in particular by means of the valve element, relative to each other beyond the locking position in the case of a relative movement of the adapter piece and the fluid connection piece. Preferably, the coupling element is constructed integrally with the valve element or the adapter piece. Preferably, the coupling element has at least one coupling face which is in abutment with the adapter piece, the fluid connection piece and/or the valve element for cooperation of the coupling element with the adapter piece, the fluid connection piece and/or the valve element. Preferably, the coupling unit comprises at least one stop face which is provided for cooperation with the coupling element, in particular the coupling face. Preferably, the coupling face is arranged on the adapter piece or the fluid connection piece, in particular independently of the coupling element. However, it is also conceivable for the coupling element to be constructed integrally with the valve element or the fluid connection piece and the adapter piece.

It is further proposed that the coupling unit comprise at least one restoring element which is arranged on the fluid connection piece or the adapter piece and which is provided to act on the adapter piece and/or the fluid connection piece, in particular in at least one disassembled state, with a force which is directed in the direction of the locking position. An advantageously reliable closure of the fluid channel in a disassembled state of the windshield wiper device can be achieved, in particular since the restoring element can retain the adapter piece and the fluid connection piece in the locking position. An undesirable discharge of wiping water mixture can advantageously be prevented when the wiper blade is changed. In particular, the restoring element is in abutment in at least one operating state with one end against the adapter piece and with another end against the fluid connection piece. Preferably, the restoring element is arranged and/or constructed in such a manner that the adapter piece and/or the fluid connection piece is/are acted on with a force in a direction orientated at least substantially parallel with the coupling path and/or at least substantially perpendicularly to the tilting axis. The term "substantially parallel" is intended in this instance to be understood in particular to be an orientation of a straight line, a plane or a vector, in particular a direction vector of the direction, relative to another straight line, another plane or another vector, in particular of the coupling path and/or the tilting axis, wherein the straight lines, the plane or the vector with respect to the other straight line, the other plane or the other vector has/have a deviation in particular less than 8°, advantageously less than 5° and in a particularly advantageous manner less than 2°. In particular, depending on a configuration of the valve element and/or the coupling element, it is conceivable for the restoring element to be provided to pull the fluid connection piece and the adapter piece toward each other in the direction of the locking position or to repel the fluid connection piece and the adapter piece away from each other in the direction of the locking position. For example, the restoring element is constructed as a spring, in particular a pressure spring or a tension spring, as a hydraulic or pneumatic piston, as a magnet or the like. In particular in an embodiment of the restoring element as a magnet, the adapter piece and/or the fluid connection piece are preferably constructed at least partially from a ferromagnetic or paramagnetic material.

It is further proposed that the windshield wiper device comprise at least one wiper arm adapter base member, wherein the fluid connection piece can be secured for a technical fluid connection of the wiper arm and the wiper blade to an, in particular the above-mentioned, wiper blade adapter of the wiper blade, and wherein the adapter piece in at least one assembled state together with the wiper arm base member is constructed so as to be able to be moved relative to the wiper blade adapter and the fluid connection piece. An advantageously automatic closure of the fluid channel in the event of a disassembly and/or change of the wiper blade from the wiper arm can be enabled. An advantageously safe and residue-free removal of the wiper blade from the wiper arm can be achieved, particularly since an undesirable discharge of fluid from a fluid line element of the wiper blade can advantageously be prevented. In particular, the wiper arm adapter base member is provided to be moved about the tilting axis relative to the wiper blade adapter and the fluid connection piece in order to be separated from the wiper blade. Preferably, the fluid connection piece is provided to be separated from the wiper blade adapter, in particular for separation of the wiper blade from the wiper arm, after or at the same time as a movement of the wiper arm adapter base member and the adapter piece about the tilting axis.

Furthermore, a wiper arm having at least one windshield wiper device according to the invention is proposed. In particular, the fluid connection piece, the adapter piece and the coupling unit are constructed as part of the wiper arm.

As a result of the configuration of the wiper arm according to the invention, an advantageously automatic closure of the fluid channel during a coupling or uncoupling operation of a wiper blade from the wiper arm can be enabled. An undesirable and/or unintentional discharge of wiping water mixture from the wiper arm during the coupling or uncoupling operation of the wiper blade can advantageously be prevented. An advantageously high safety level for the user while changing the wiper blade can thereby be enabled.

In addition, a windshield wiper having at least one windshield wiper device according to the invention is proposed.

As a result of the configuration of the windshield wiper according to the invention, an advantageously automatic closure of the fluid channel in the event of a coupling or uncoupling operation of a wiper blade from a wiper arm of the windshield wiper can be enabled. Undesirable and/or unintentional discharge of wiping water mixture from the wiper arm during the coupling or uncoupling operation of the wiper blade can advantageously be prevented. An advantageously high level of safety for a user when the wiper blade is changed can thereby be enabled.

The windshield wiper device according to the invention, in particular wiper arm adapter device, the wiper arm according to the invention and/or the windshield wiper according to the invention, is/are not intended in this instance to be limited to the above-described application and embodiment. In particular, the windshield wiper device according to the invention, in particular the wiper arm adapter device, the wiper arm according to the invention and/or the windshield wiper according to the invention may, in order to perform a function described herein, have a number of individual elements, components and units different from the number mentioned herein. In addition, in these value ranges set out in this disclosure, values which lie within the limits mentioned should also be considered to be disclosed and freely usable.

BRIEF DESCRIPTION OF THE DRAWINGS

Other advantages will be appreciated from the following description of the drawings. In the drawings, an embodiment of the invention is illustrated. The drawings, the description and the claims contain numerous features in combination. The person skilled in the art will advantageously also consider the features individually and combine them to form advantageous additional combinations.

In the drawings.

DETAILED DESCRIPTION

Figure 1:
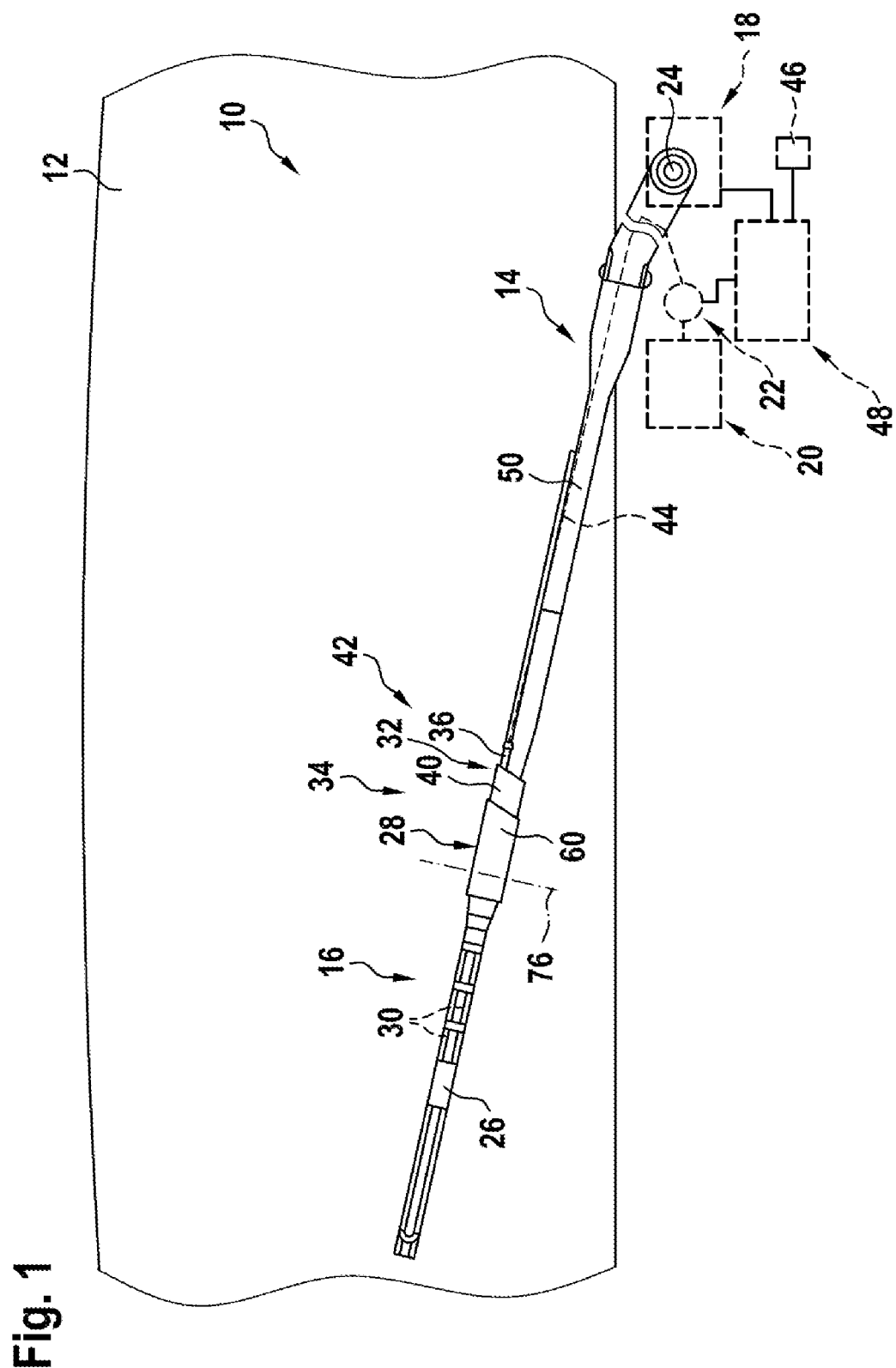
FIG. 1 is a schematic illustration of a windshield wiper according to the invention having a wiper arm according to the invention and a windshield wiper device according to the invention in a mounted state.

FIG. 1 shows a windshield wiper 10 in a mounted state on a windshield 12. In particular, the window 12 is constructed as the front window of a vehicle which is not shown in the Figures. However, it is also conceivable for the windshield wiper 10 to be arranged on a window 12 of a stationary object, such as, for example, a building or another transport means. The windshield wiper 10 comprises a wiper arm 14, a wiper blade 16, a drive unit 18, a fluid container 20 and a pump unit 22. Preferably, the drive unit 18 has a drive shaft 24 which is driven by means of a drive element of the drive unit 18, which is not shown in FIG. 1 in particular, wherein in particular the wiper arm 14 is secured to the drive shaft 24 and can be moved via the drive shaft 24 along a surface of the window 12. The wiper blade 16 comprises a wiper strip 26 and a wiper blade adapter 28 for connecting the wiper blade 16 to the wiper arm 14. The wiper strip 26 comprises two fluid directing elements 30 which are provided to direct the fluid from the wiper blade adapter 28 to one of a large number of outlet openings of the wiper blade 16 which are not shown in FIG. 1. The wiper arm 14 comprises a wiper arm adapter 32 for mechanically securing the wiper blade 16, in particular the wiper blade adapter 28, to the wiper arm 14. The windshield wiper 10 comprises a windshield wiper device 34 which comprises a fluid connection piece 36 which delimits a fluid channel 38 (see FIG. 2), an adapter piece 40 and a coupling unit 42. The fluid connection piece 36, the adapter piece 40 and the coupling unit 42 are constructed as part of the wiper arm 14. The adapter piece 49 is movably supported relative to the fluid connection piece 36 and provided to be moved relative to the fluid connection piece 36 during a coupling or uncoupling operation with respect to the wiper blade 16. The coupling unit 42 is provided to close the fluid channel 38 in accordance with a position of the adapter piece 40 relative to the fluid connection piece 36. The wiper arm 14 comprises a fluid directing element 44 for technical fluid connection of the fluid container 20 to the fluid connection piece 36. The wiper blade 16 can be secured via the wiper blade adapter 28 to the wiper arm 14, in particular the wiper arm adapter 32. In particular, the wiper blade 16 is rotatably supported relative to the wiper arm 14 via the wiper blade adapter 28 and the wiper arm adapter 32 in at least one operating state of the windshield wiper 10, in particular for the coupling or uncoupling operation during assembly or disassembly of the wiper blade 16. The windshield wiper 10 comprises an activation element 46 which is constructed in particular as a wiper lever for controlling and/or regulating at least one function of the windshield wiper 10 by a user. The windshield wiper 10 comprises a control and/or regulation unit 48 which is provided at least for controlling and/or regulating the pump unit 22 and/or the drive unit 18. The pump unit 22 is particularly provided to convey the fluid from the fluid container 20 via the wiper arm 14, in particular the fluid directing element 44 of the wiper arm 14, and the fluid connection piece 36 to the wiper blade adapter 28.

Figure 2:
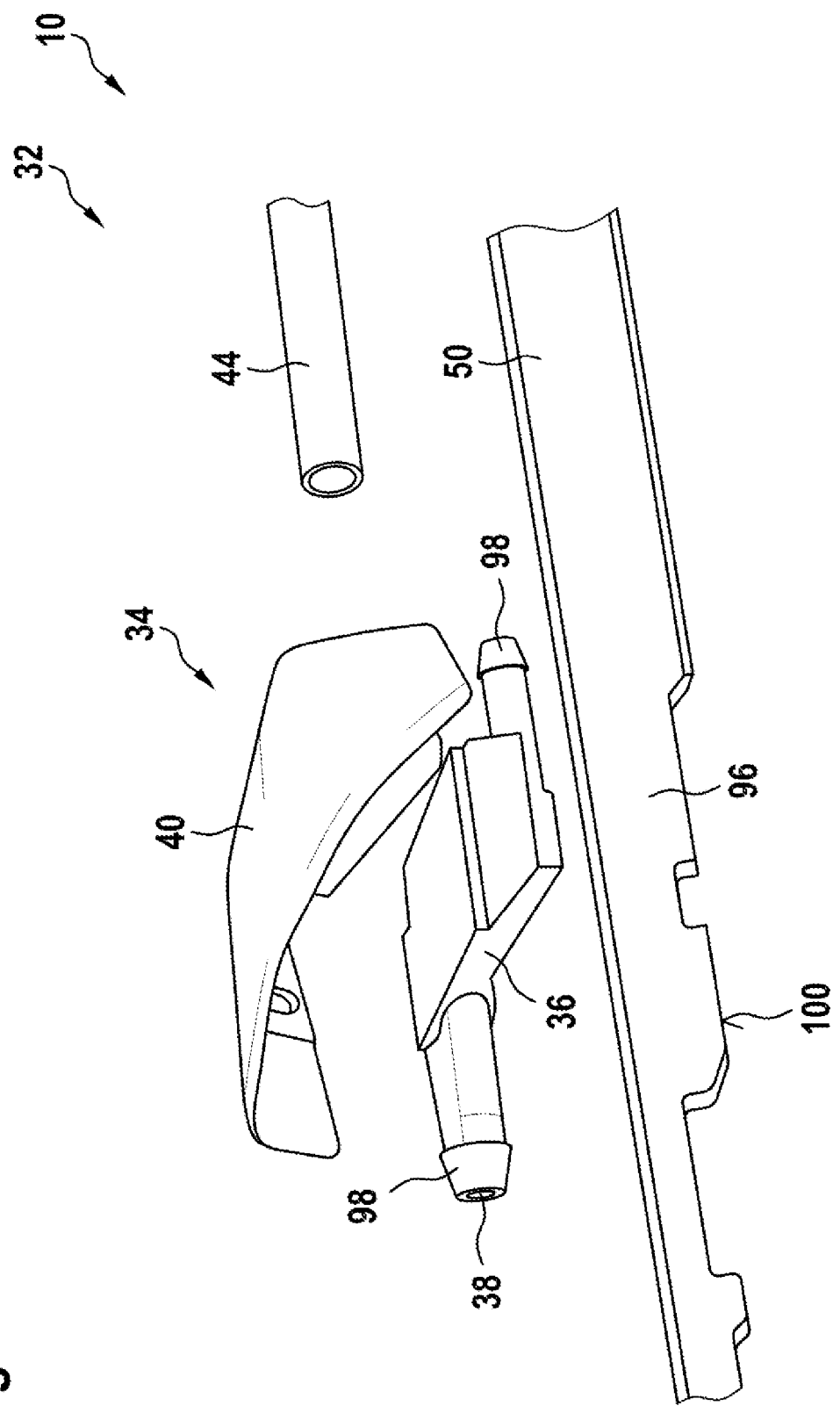
FIG. 2 is an exploded view of the wiper arm according to the invention with the windshield wiper device according to the invention in a region of a wiper arm adapter of the wiper arm.

FIG. 2 shows an exploded illustration of the wiper arm adapter 32 and the windshield wiper device 34, in particular the adapter piece 40 and the fluid connection piece 36. The wiper arm adapter 32 is constructed as a mechanical interface for connection to the wiper blade adapter 28 (see also FIGS. 3 and 4) and is constructed integrally with a wiper rod 50 of the wiper arm 14. The wiper arm adapter 32 comprises a wiper arm adapter base member 96, wherein the fluid connection piece 36 for a technical fluid connection of the wiper arm 14 and the wiper blade 16 can be secured to the wiper blade adapter 28 of the wiper blade 16, and wherein the adapter piece 40 in at least one assembled state together with the wiper arm adapter base member 96 is constructed to be able to be moved relative to the wiper blade adapter 28 and the fluid connection piece 36. The wiper arm adapter base member 96 has at one side stepped side faces 100 which are provided for cooperation with the wiper blade adapter 28. The fluid connection piece 36 comprises two connection nozzles 98 which are provided for connection to a fluid connection element 64 of the wiper blade adapter 28 or the fluid directing element 44 of the wiper arm 14.

Figure 3:
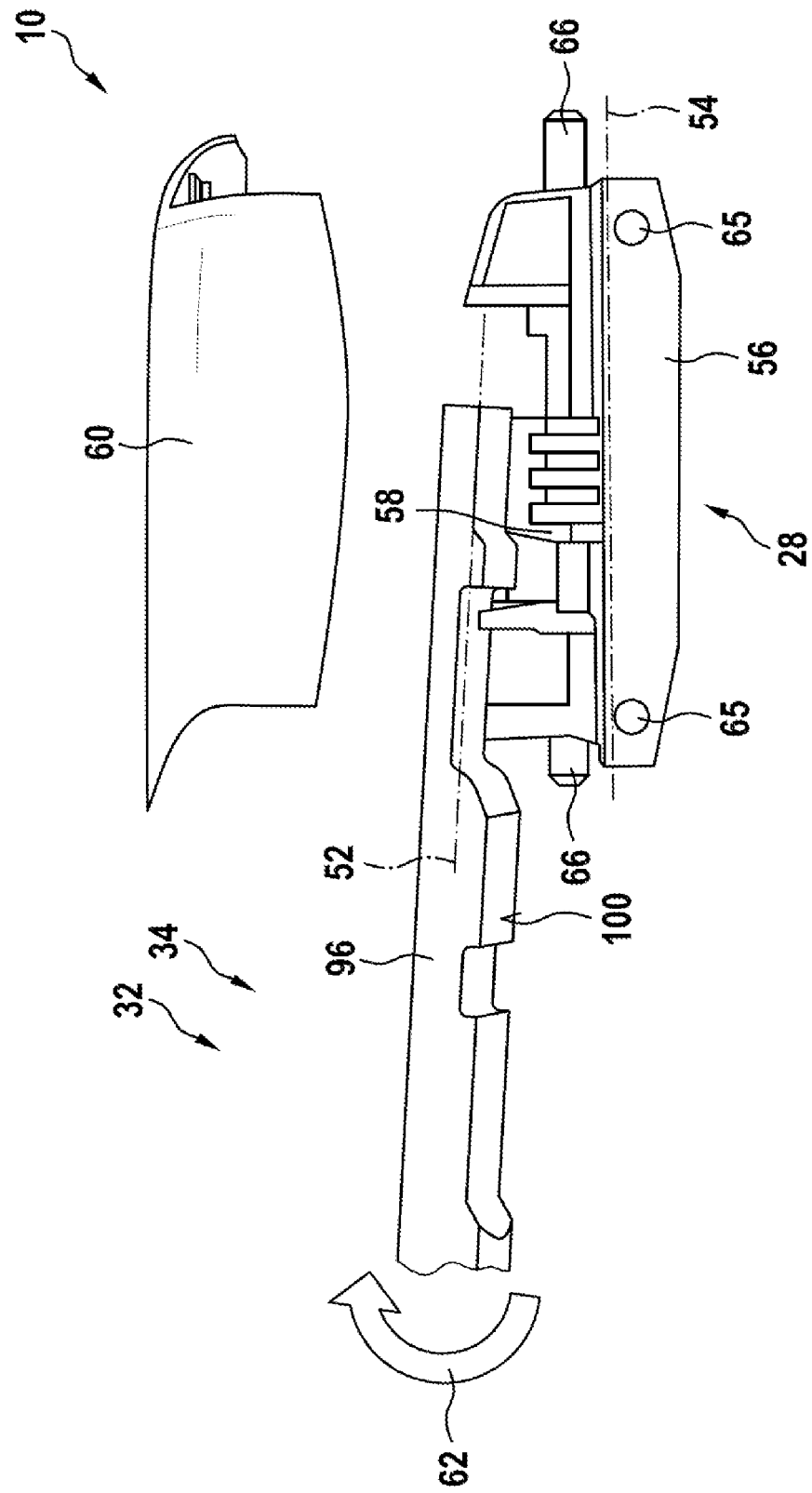
FIG. 3 is a schematic drawing of the wiper arm adapter of the wiper arm according to the invention being assembled on a wiper blade adapter of the wiper blade.

FIG. 3 is a schematic illustration of an assembly of the wiper blade 16, in particular the wiper blade adapter 28, and the wiper arm 14, in particular the wiper arm adapter 32. The wiper arm adapter 32 is provided to be pushed out onto the wiper blade adapter 28 for securing along a main extent axis 52 of the wiper arm adapter 32. The wiper arm adapter 32 can be connected to the wiper blade adapter 28 by means of a movement along a main extent axis 54, in particular a longitudinal axis, of the wiper blade adapter 28.

The wiper blade adapter 28 comprises a wiper blade adapter base member 56 which has a structured surface 58. The structured surface 58 of the wiper blade adapter base member 56 is provided for plug type and rotational connection to the wiper arm adapter 32. The wiper blade adapter base member 56 is produced from a plastics material, in particular from a molding compound. The wiper blade adapter 28 is constructed in several parts and has the wiper blade adapter base member 56 and a securing element 60. The securing element 60 can be connected by means of a plug type connection and/or a locking connection to the wiper blade adapter base member 56. The securing element 60 is provided to be pushed onto the wiper blade adapter base member 56 in order to fix the wiper arm adapter 32, wherein the wiper arm adapter 32 is secured with respect to a movement along the main extent axis 52 of the wiper arm adapter 32 beyond an angular range 62 on the wiper blade adapter base member 56. In particular, the securing element 60 is movably supported on the wiper blade adapter base member 56 and constructed to be able to be tilted at least partially with the wiper blade adapter 32 relative to the wiper blade adapter base member 56. The wiper blade adapter 28 and the wiper arm adapter 32 are constructed in such a manner that the wiper arm adapter 32 can be separated from the wiper blade adapter 28 if the wiper arm adapter 32 is tilted relative to the wiper blade adapter 28 beyond the angular range 62. In particular, the angular range 62 comprises values for an angle of the wiper arm adapter 32, in particular the main extent axis 52 of the wiper arm adapter 32, relative to the wiper blade adapter 28, in particular the main extent axis 54 of the wiper blade adapter 28, between $-2°$ and $+10°$. However, other configurations of the wiper arm adapter 32 and/or the wiper blade adapter 28 are also conceivable, in particular with a differently constructed angular range 62.

Figure 4:
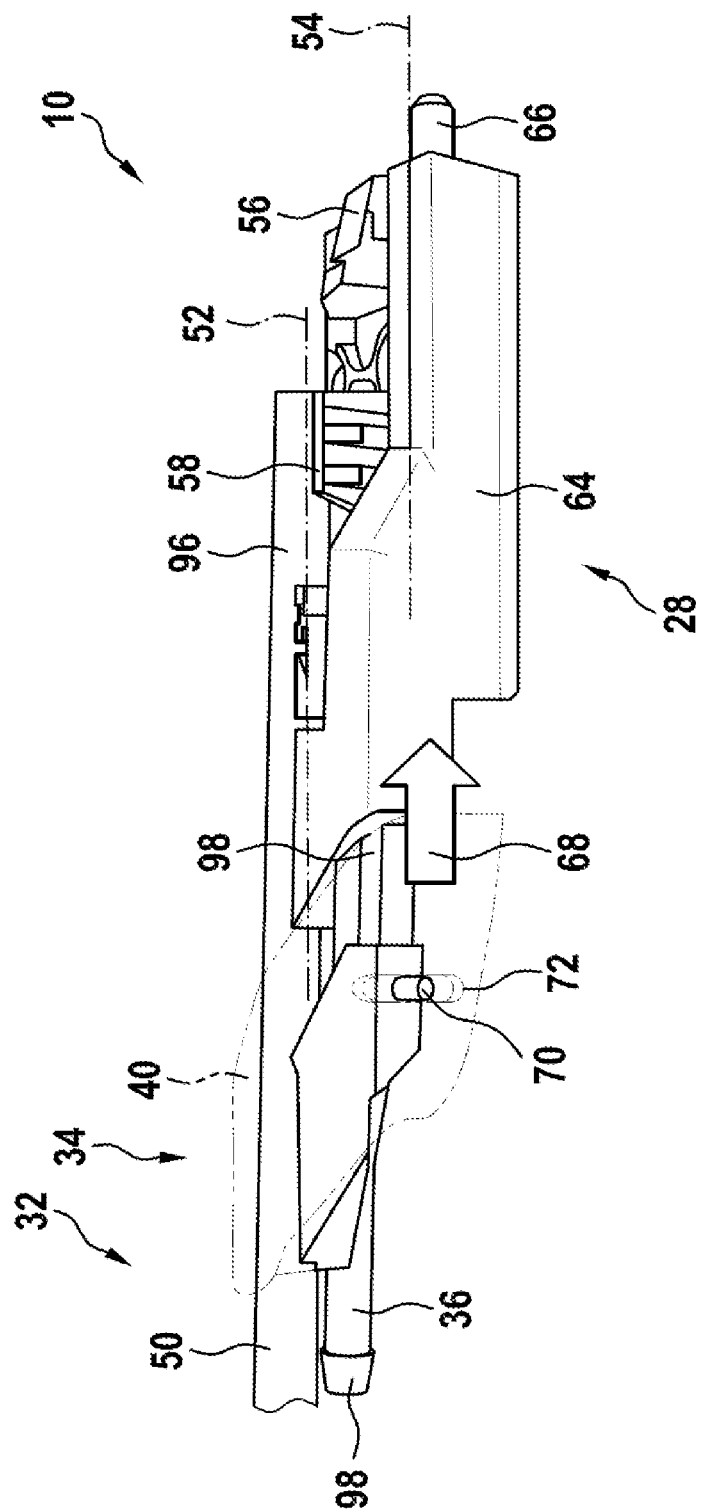
FIG. 4 is a schematic illustration of the windshield wiper according to the invention in a region of the wiper arm adapter during connection to a wiper blade of the windshield wiper.

FIG. 4 shows an assembly of the wiper blade 16 on the wiper arm 14, wherein in particular the securing element 60 of the wiper blade adapter 28 is not shown. The wiper blade adapter 28 comprises a fluid connection element 64 which is provided for technical fluid connection to the fluid connection piece 36. The wiper blade adapter base member 56 has two fluid inlets 65 and two fluid outlets 66 (see also FIG. 3). The two fluid outlets 66 are each arranged at sides of the wiper blade adapter base member 56 facing away from each other and are provided for connection to the wiper strip 26. The wiper blade adapter base member 56 is in each case constructed in a region of the two fluid outlets 66 as a pipe continuation. The two fluid inlets 65 are provided for technical fluid connection to the fluid connection element 64. Preferably, the fluid connection element 64 is provided to direct the fluid from the fluid connection piece 36 to the two fluid inlets 65. The two fluid outlets 66 each have fluid flow directions which are orientated through 1800 relative to each other. The fluid connection element 64 has an at least substantially L-shaped outer contour, in particular in a cross-section of the fluid connection element 64 which is orientated perpendicularly to the fluid inlets 65. The fluid connection element 64 is arranged and secured on the wiper blade adapter base member 56. However, it is also conceivable for the fluid connection element 64 to be constructed integrally with the wiper blade adapter base member 56. In a particularly preferred manner, the fluid connection element 64 is constructed separately from or independently of the securing element 60. Preferably, the securing element 60 is provided to at least partially surround or conceal the fluid connection element 64 in at least one assembled state (see also FIG. 5). The fluid connection piece 36 is provided to be pushed into the fluid connection element 64 for technical fluid connection to the wiper blade adapter 28, in particular via a movement in a connection direction 68 of the fluid connection piece 36. In a particularly preferred manner, the fluid connection piece 36 is fixed to the fluid connection element 64 as a result of the connection to the fluid connection element 64 at least relative to a tilting of the fluid connection piece 36 relative to the wiper blade adapter base member 56, in particular the main extent axis 54 of the wiper blade adapter 28. The adapter piece 40 engages around or surrounds the fluid connection piece 36 at least partially, in particular in at least one plane of section which is orientated at least substantially perpendicularly to the main extent axis 52 of the wiper arm adapter 32.

Figure 5:
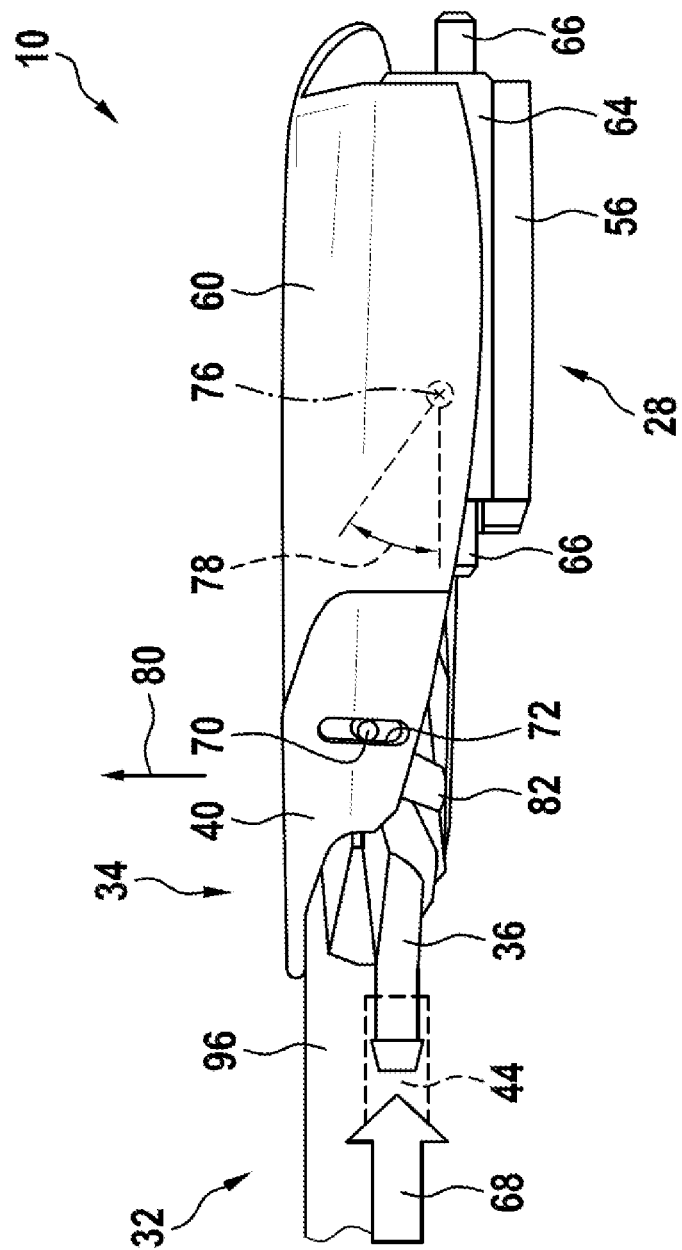
FIG. 5 is a schematic illustration of the windshield wiper according to the invention with the wiper arm according to the invention and the windshield wiper device according to the invention in the region of the wiper arm adapter in the assembled state.

In FIG. 5, the wiper blade 16 is shown in a state mounted on the wiper arm 14. The coupling unit 42 comprises a guiding element 70 and a counter-guiding element 72. The guiding element 70 is provided to guide the fluid connection piece 36 during a movement relative to the adapter piece 40 on the adapter piece 40. Preferably, the fluid connection piece 36 is movably supported on the adapter piece 40 and the wiper arm adapter 32 by means of the coupling unit 42, in particular the guiding element 70. Preferably, the guiding element 70 is constructed in such a manner that the adapter piece 40 is guided relative to the fluid connection piece 36 along a coupling path 74 (see FIG. 6). The guiding element 70 is arranged on the fluid connection piece 36 and constructed integrally with the fluid connection piece 36. The guiding element 70 is constructed as a guiding pin. The counter-guiding element 72 is constructed as a guide recess which is delimited via the adapter piece 40 and is constructed to correspond to the guiding element 70. In particular, the guiding element 70 and the counter-guiding element 72 are constructed together as an elongate hole guide. However, other embodiments of the guiding element 70 and/or the counter-guiding element are also conceivable, for example, as a roller guide, a rail guide or the like.

Figure 6:
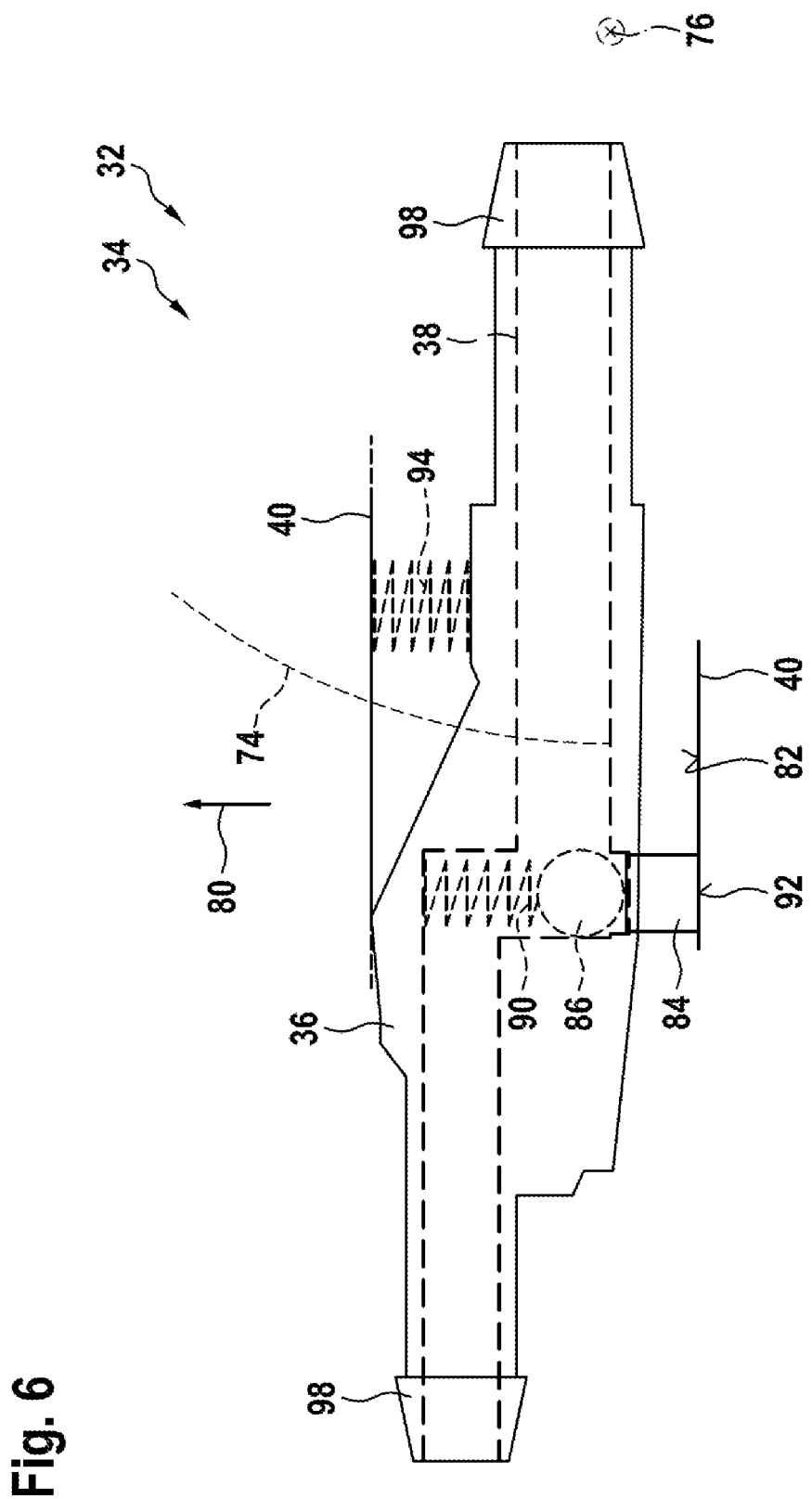
FIG. 6 is a schematic sectioned view of a fluid connection piece and a coupling unit of the windshield wiper device according to the invention.
Figure 7:
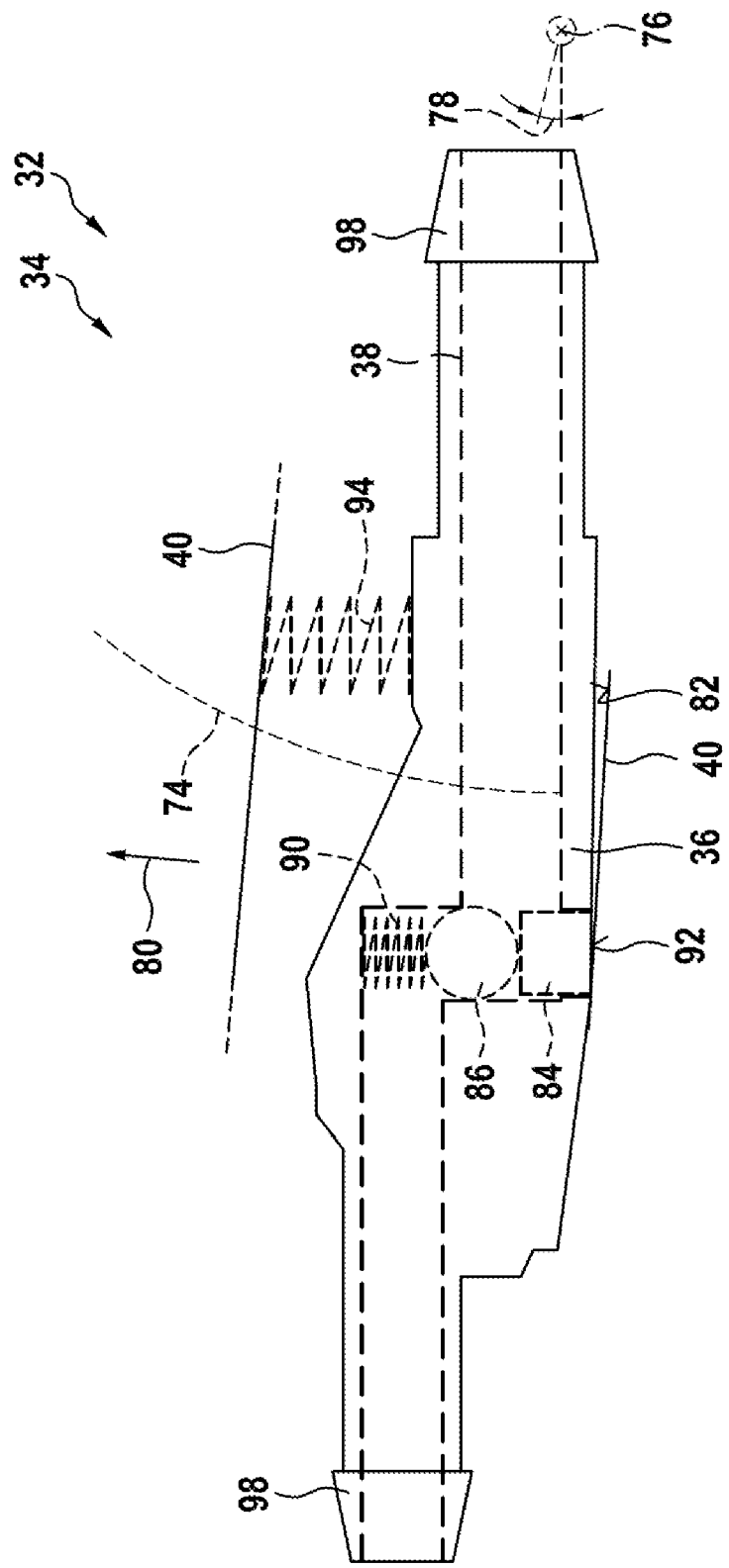
FIG. 7 is a schematic sectioned view of a fluid connection piece and a coupling unit of the windshield wiper device according to the invention in a locking position.

The adapter piece 40 has a tilting axis 76, about which the adapter piece 40 can be moved relative to the fluid connection piece 36 during the coupling or uncoupling operation, wherein the coupling unit 42 is provided to close the fluid channel 38, in particular completely, at a tilting angle 78 of the adapter piece 40 relative to the fluid connection piece 36, in particular in a closure direction 80 of the windshield wiper device 34, about the tilting axis 76 of more than 5°, preferably more than 10° and in a particularly preferred manner more than 15° (see FIGS. 6 and 7). Preferably, the coupling unit 42 is provided to close the fluid channel, in particular completely, at a tilting angle 78 of the adapter piece 40 relative to the fluid connection piece 36 in a direction orientated counter to the closure direction 80 about the tilting axis of more than 2°, preferably more than 4° and in a particularly preferred manner more than 6°. Preferably, the closure direction 80 is orientated at least substantially perpendicularly relative to the tilting axis 76. In particular, the wiper blade 16 is provided, via a movement in a direction orientated counter to the closure direction 80 relative to the wiper arm 14, to be separated from the wiper arm 14, in particular the wiper arm adapter 32. The coupling path 74 is at least for the most part arranged around the tilting axis 76. In particular, the coupling path 74 is arranged, in particular at least partially in a circular manner, around the tilting axis 76. The tilting axis 76 is orientated at least substantially perpendicularly to the main extent axis 52 of the wiper arm adapter 32 and the main extent axis 54 of the wiper blade adapter 2. In a particularly preferred manner, the wiper blade 16, in particular the wiper blade adapter 28, is provided to be moved about the tilting axis 76 during the uncoupling operation.

The adapter piece 40 can be moved relative to the securing element 60 of the wiper blade adapter 28 and secured to the wiper blade adapter 32. However, it is also conceivable for the adapter piece 40 in the mounted state to be secured to the securing element 60 of the wiper blade adapter 28. The fluid connection piece 36 can be moved together with the wiper blade adapter 28 relative to the wiper arm adapter 32 and connected to the fluid connection element 64 of the wiper blade adapter 28. The adapter piece 40 is provided, for disassembly of the wiper blade 16, in particular in the uncoupling operation, to be moved relative to the fluid connection piece 36 about the tilting axis 76, in particular along the coupling path 74. The adapter piece 40 surrounds the fluid connection piece 36 at least partially. The adapter piece 40 has a stop face 82 which is arranged at a side of the adapter piece 40 facing the fluid connection piece 36. The stop face 82 is provided to act on the fluid connection piece 36 or the coupling unit 42, in particular a coupling element 84 (see FIG. 6) of the coupling unit 42, with a force which is orientated in a direction of a movement of the adapter piece 40 relative to the fluid connection piece 36. The stop face 82 is at least for the most part orientated at least substantially parallel with the main extent axis 52 of the wiper arm adapter 32 and at least substantially parallel with the tilting axis 76. In particular, the stop face 82 is arranged on an inner side of the adapter piece 40 facing the fluid connection piece 36. Preferably, the stop face 82 is constructed as part of the coupling unit 42 and is provided, in particular by means of cooperation with the coupling element 84, to close the fluid channel 38 delimited by the fluid connection piece 36 depending on the position of the adapter piece 40 relative to the fluid connection piece 36. However, other embodiments of the adapter piece 40, in particular the stop face 82, are also conceivable.

FIGS. 6 and 7 show in each case a schematic sectioned view of the fluid connection piece 36, in particular in a plane of section which is orientated at least substantially perpendicularly to the tilting axis 76. The coupling unit 42 is at least for the most part arranged on the fluid connection piece 36. The coupling unit 42 comprises a valve element 86 which is arranged on the fluid connection piece 36 and which is provided to close the fluid channel 38 in accordance with the position of the adapter piece 40 relative to the fluid connection piece 36. The adapter piece 40 is shown schematically in FIG. 6 in a position relative to the fluid connection piece 36, in which the fluid channel 38 is released from the valve element 86. Particularly in FIGS. 6 and 7, only the stop face 82 of the adapter piece 40 facing the fluid connection piece 36 is shown. The valve element 86 is at least partially arranged inside the fluid channel 38. The fluid connection piece 36, in particular the fluid channel 38, is provided to direct the fluid from the fluid directing element 44 to the wiper blade adapter 28, in particular to the fluid connection element 64. The valve element 86 is secured to the fluid connection piece 36 by means of a resilient element 90. The resilient element 90 is arranged on an inner wall of the fluid connection piece 36 delimiting the fluid channel 38. The valve element 86 is constructed to be able to be mechanically controlled. In a particularly preferred manner, the valve element 86 is provided, in accordance with the position of the adapter piece 40 relative to the fluid connection piece 36, to be controlled to open or close the fluid channel 38. The valve element 86 is constructed as a spherical stopper, which is moved into the fluid channel 38 in accordance with the position of the adapter piece 40 relative to the fluid connection piece 36 in order to close the fluid channel 38 counter to a resilient force of the resilient element 90. However, other embodiments of the valve element 86 are also conceivable, for example, as a Schrader valve, a Dunlop valve or the like. In particular, the valve element 86 is provided to close the fluid channel 38 completely or in a water-tight manner. The coupling unit 42 comprises the coupling element 84, which is arranged at least partially on the valve element 86 and which is provided, during a movement of the adapter piece 40 relative to the fluid connection piece 36 into at least one locking position, in particular by means of cooperation with the stop face 82, to cooperate with the valve element 86 in such a manner that the valve element 86 closes the fluid channel 38, in particular completely. In FIG. 7, the adapter piece 40 and the fluid connection piece 36 are shown in the locking position, wherein the adapter piece 40 is moved or tilted relative to the fluid connection piece 36 about the tilting axis 76 through a tilting angle 78 of 11°. The coupling element 84 is constructed as a mechanical coupling element 84 which during the movement of the adapter piece 40 relative to the fluid connection piece 36 into the locking position cooperates by means of a positive-locking and/or non-positive-locking connection with the stop face 82 of the adapter piece 40 and the valve element 86, wherein in particular the valve element 86 closes the fluid channel 38, in particular completely. Preferably, a movement of the coupling element 84 along the coupling path 74 is limited via the valve element 86 and the fluid channel 38. In particular, the coupling unit 42, in particular the coupling element 84, is provided to prevent a relative movement of the adapter piece 40 and the fluid connection piece 36 relative to each other beyond the locking position. It is conceivable for the coupling element 84 to be constructed integrally with the valve element 86 and/or the adapter piece 40, in particular the stop face 82. Preferably, the coupling element 84 has at least one coupling face 92 which is in abutment with the adapter piece 40 for cooperation of the coupling element 84 with the stop face 82 of the adapter piece 40. However, it is also conceivable for the coupling element 84 to be constructed integrally with the valve element 86 or the fluid connection piece 36 and with the adapter piece 40, wherein in particular the fluid channel 38, in particular directly, is closed or released via a movement of the adapter piece 40 relative to the fluid connection piece 36. However, other embodiments of the coupling unit 42, in particular the coupling element 84, are also conceivable. Preferably, a mechanical connection of the wiper blade adapter 28 to the wiper arm adapter 32 and a technical fluid connection of the wiper blade adapter 28 to the wiper arm adapter 32 are constructed independently of each other and can be connected or separated at different values of the tilting angle 78. In a particularly preferred manner, the windshield wiper device 34 is provided to at least temporarily close the fluid channel 38 during a movement of the wiper blade adapter 28 relative to the wiper arm adapter 32 in order to separate the mechanical connection of the wiper blade adapter 28 to the wiper arm adapter 32.

In addition, it is conceivable for the coupling unit 42 to comprise a restoring element 94 which is arranged on the fluid connection piece 36 or the adapter piece 40 and which is provided to act on the adapter piece 40 and/or the fluid connection piece 35, in particular in at least one disassembled state, with a force which is directed in the direction of the locking position. The restoring element 94 is illustrated in FIGS. 6 and 7 in a state indicated in an exemplary arrangement. In particular, the restoring element 94 in at least one operating state is in abutment at one end with the adapter piece 40 and at the other end with the fluid connection piece 36. In the embodiment shown in FIG. 6, the restoring element 94 is arranged or secured to the fluid connection piece 36. Preferably, the restoring element 94 is arranged and/or constructed in such a manner that the adapter piece 40 and/or the fluid connection piece 36 is/are acted on with a force in a direction which is orientated at least substantially parallel with the coupling path 74 and/or at least substantially perpendicularly to the tilting axis 76. Particularly in accordance with an embodiment of the valve element 86 and/or the coupling element 84, it is conceivable for the restoring element 94 to be provided to repel the fluid connection piece 36 and the adapter piece 40 away from each other in the direction of the locking position or to retain them in the locking position (see FIG. 7). For example, in particular as shown in FIGS. 6 and 7, the restoring element 94 is constructed as a spring, in particular a pressure spring. However, other embodiments of the restoring element 94 are also conceivable, for example, as a magnet. In particular in an embodiment of the restoring element 94 as a magnet, the adapter piece 40 and/or the fluid connection piece 36 is/are preferably at least partially constructed from a ferromagnetic and/or paramagnetic material.

The invention claimed is:

1. A windshield wiper device, comprising
at least one fluid connection piece (36) which delimits at least one fluid channel (38),
at least one adapter piece (40), wherein the adapter piece (40) and the fluid connection piece (36) are configured to rotate relative to each other and are configured to be rotated relative to each other during a coupling or uncoupling operation, and
at least one coupling unit (42) which is configured to close the fluid channel (38) in accordance with a rotational position of the adapter piece (40) relative to the fluid connection piece (36), wherein the coupling unit (42) includes at least a portion the adapter piece (40).

2. The windshield wiper device according to claim 1, characterized in that the fluid connection piece (36), the adapter piece (40) and the coupling unit (42) are constructed as part of a wiper arm (14).

3. The windshield wiper device according to claim 2, characterized by at least one wiper arm adapter base member (96), wherein the fluid connection piece (36) for a technical fluid connection of the wiper arm (14) and the wiper blade (16) can be fixed to a wiper blade adapter (28) of the wiper blade (16), and wherein the adapter piece (40) in at least one assembled state is configured to be able to be moved together with the wiper arm adapter base member (96) relative to the wiper blade adapter (28) and the fluid connection piece (36).

4. The windshield wiper device according to claim 1, characterized in that the coupling unit (42) comprises at least one valve element (86) which is arranged on the fluid connection piece (36) and which is configured to close the fluid channel (38) in accordance with the position of the adapter piece (40) relative to the fluid connection piece (36).

5. The windshield wiper device at least according to claim 4, characterized in that the coupling unit (42) comprises at least one coupling element (84) which is arranged at least partially on the valve element (86) and at least partially on the adapter piece (40), and which is configured, in the case of a movement of the adapter piece (40) relative to the fluid connection piece (36) into at least one locking position, to cooperate with the valve element (86) in such a manner that the valve element (86) closes the fluid channel (38).

6. The windshield wiper device according to claim 5, characterized in that the coupling unit (42) comprises at least one restoring element (94) which is arranged on the fluid connection piece (36) and which is configured to act on the adapter piece (40) with a force which is directed in the direction of the locking position.

7. The windshield wiper device at least according to claim 4, characterized in that the coupling unit (42) comprises at least one coupling element (84) which is arranged at least partially on the valve element (86) and at least partially on the adapter piece (40), and which is configured, in the case of a movement of the adapter piece (40) relative to the fluid connection piece (36) into at least one locking position, to cooperate with the valve element (86) in such a manner that the valve element (86) closes the fluid channel (38) completely.

8. The windshield wiper device according to claim 5, characterized in that the coupling unit (42) comprises at least one restoring element (94) which is arranged on the fluid connection piece (36) and which is configured to act on the adapter piece (40), in at least one disassembled state, with a force which is directed in the direction of the locking position.

9. The windshield wiper device according claim 1, characterized in that the coupling unit (42) comprises at least one guiding element (70) which is configured to guide the fluid connection piece (36) during a movement relative to the adapter piece (40) on the adapter piece (40).

10. The windshield wiper device according to claim 1, characterized in that the adapter piece (40) has at least one tilting axis (76), about which the adapter piece (40) can be moved relative to the fluid connection piece (36) during the coupling or uncoupling operation, wherein the coupling unit (42) is configured, at a tilting angle (78) of the adapter piece (40) relative to the fluid connection piece (36) about the tilting axis (76) of more than 5°, to close the fluid channel (38).

11. A wiper arm (14) comprising the windshield wiper device (34) according to claim 1, wherein the fluid connection piece (36), the adapter piece (40) and the coupling unit (42) are constructed as part of the wiper arm (14).

12. The wiper arm according to claim 11, characterized by at least one wiper arm adapter base member (96), wherein the fluid connection piece (36) for a technical fluid connection of the wiper arm (14) and the wiper blade (16) can be fixed to a wiper blade adapter (28) of the wiper blade (16), and wherein the adapter piece (40) in at least one assembled state is configured to be able to be moved together with the wiper arm adapter base member (96) relative to the wiper blade adapter (28) and the fluid connection piece (36).

13. A windshield wiper having at least one windshield wiper device (34) according to claim 1.

14. The windshield wiper device according to claim 1, wherein the adapter piece (40) and the fluid connection piece (36) are configured to be moved relative to each other during a coupling or uncoupling operation with a wiper blade (16).

15. The windshield wiper device according to claim 1, characterized in that the adapter piece (40) has at least one tilting axis (76), about which the adapter piece (40) can be moved relative to the fluid connection piece (36) during the coupling or uncoupling operation, wherein the coupling unit (42) is configured, at a tilting angle (78) of the adapter piece (40) relative to the fluid connection piece (36) about the tilting axis (76) of more than 5°, to close the fluid channel (38) completely.

16. A windshield wiper device, comprising
at least one fluid connection piece (36) which delimits at least one fluid channel (38),
at least one adapter piece (40), wherein the adapter piece (40) and the fluid connection piece (36) are configured to be able to be moved relative to each other and are configured to be moved relative to each other during a coupling or uncoupling operation, and
at least one coupling unit (42) which is configured to close the fluid channel (38) in accordance with a position of the adapter piece (40) relative to the fluid connection piece (36), wherein the coupling unit (42) includes at least a portion the adapter piece (40);
wherein the coupling unit (42) comprises at least one valve element (86) which is arranged on the fluid connection piece (36) and which is configured to close the fluid channel (38) in accordance with the position of the adapter piece (40) relative to the fluid connection piece (36).

17. The windshield wiper device according to claim 16, wherein the coupling unit (42) comprises at least one coupling element (84) which is arranged at least partially on the valve element (86) and at least partially on the adapter piece (40), and which is configured, in the case of a movement of the adapter piece (40) relative to the fluid connection piece (36) into at least one locking position, to cooperate with the valve element (86) in such a manner that the valve element (86) closes the fluid channel (38).

18. The windshield wiper device according to claim 17, wherein the coupling unit (42) comprises at least one restoring element (94) which is arranged on the fluid connection piece (36) and which is configured to act on the adapter piece (40) with a force which is directed in the direction of the locking position.

19. The windshield wiper device according to claim 17, wherein the coupling unit (42) comprises at least one restoring element (94) which is arranged on the fluid connection piece (36) and which is configured to act on the adapter piece (40), in at least one disassembled state, with a force which is directed in the direction of the locking position.

20. The windshield wiper device according to claim 16, wherein the coupling unit (42) comprises at least one coupling element (84) which is arranged at least partially on the valve element (86) and at least partially on the adapter piece (40), and which is configured, in the case of a movement of the adapter piece (40) relative to the fluid connection piece (36) into at least one locking position, to cooperate with the valve element (86) in such a manner that the valve element (86) closes the fluid channel (38) completely.

* * * * *